Patented July 12, 1932

1,867,117

UNITED STATES PATENT OFFICE

JOHANN TENGLER, OF TAGERWILEN, SWITZERLAND

PROCESS FOR THE MANUFACTURE OF A CLEANSING MEDIUM AND PRODUCT THEREOF

No Drawing. Application filed May 26, 1927, Serial No. 194,529, and in Switzerland June 3, 1926.

The object of the present invention is to provide a process for the manufacture of a cleansing medium or soap in such manner that a volatile element such as benzine incorporated therein will be held therein against escape by evaporation, and to obtain the resulting soap product.

Various suitable oils may be employed with other suitable ingredients. The process involves taking a suitable quantity of saponifiable oil, mixing it with a portion of caustic soda solution according to the oil saponification number, and hardening the resulting mass, then melting such hard composition with the addition of a quantity of benzine, which may be added in either a warm, or vapor state, and allowing the resulting mass to cool, in which state it is so hard it can be pulverized. Then a saponaceous mass with a suitable fat content and high alkaline content is prepared and brought to a pasty or semi-fluid state, when the first mixture or mass containing benzine, which is in a pulverized state, is added to the second saponaceous mass, and the resulting mass is cooled until it hardens, producing a hard soap from which the benzine cannot escape because the soapy mass forms a skin over each of such pulverized particle of the pulverized benzine-containing saponaceous mass.

The cleansing medium or soap produced by the above process possesses the advantages of being easily soluble and cheap of manufacture.

An illustration of the practice of my invention is given, as follows. Two parts of cocoanut oil are melted and mixed with a portion of caustic soda solution of 38 Bè. according to the saponification numbers. This mixture is then left for five to six hours without releasing the heat, so that a hard composition results. This is then melted with the addition of benzine, which may be added either warm or in the form of vapor the benzine added being in an amount which will not hinder hardening and which will remain in the hard soap as hereinafter explained. This mass is then allowed to cool, in which condition it is so solid and hard it can be pulverized by a machine or any suitable means. A saponaceous mass with a fat content of about 10% and high alkaline content is prepared, and is then submitted to a hardening process until it becomes pasty or semi-fluid, and the benzine containing saponaceous mass, in pulverized condition, is then added to, and thoroughly mixed into, such semi-fluid mass so as to coat all of the pulverized particles with such semi-fluid saponaceous mass, and the resulting mass is completely cooled until it becomes a hard soap, in which form all of the particles of the intermixed pulverized benzine containing mass will be covered by, and sealed in an envelope or skin formed thereover by the formerly semi-fluid mass to which the pulverized mass was added and with which it was thoroughly intermixed, and such skin or sealing envelope effectually prevents the escape of the benzine from such pulverized particles.

Having thus described my invention, what I claim as new and desire to secure by Letters Patent is:

1. A process for making a cleansing medium comprising the following steps, the mixing of a caustic soda solution with a saponifiable oil and in proportions to produce saponification and treating to produce a hard composition, next melting such composition and adding benzine thereto then hardening to a state wherein it can be pulverized and with benzine contained therein, next pulverizing such resulting hardened benzine containing mass, next mixing such pulverized mass into a semi-fluid saponaceous mass so that the individual particles of the pulverized mass are coated with such semi-fluid material, and finally cooling the resulting mass to a hard state.

2. A process for making a cleansing medium comprising the mixing of ingredients that saponify including a saponifiable oil and a saponifying reagent hardening the resulting composition, melting the composition and adding benzine thereto, hardening the resulting product, pulverizing the hardened benzine-containing mass and then coating individual pulverized particles with soap which prevents the escape of the benzine therefrom.

3. A soap comprising a body consisting of a quantity of soap particles containing benzine, such particles being enclosed in an envelope of saponaceous material which seals against the escape of the benzine by evaporation.

In testimony whereof I affix my signature.
JOHANN TENGLER.